No. 612,093. Patented Oct. 11, 1898.
O. O. FJELD.
CULTIVATOR.
(Application filed June 1, 1897.)
(No Model.) 2 Sheets—Sheet 1.

Witnesses
Chas. P. Heinemann.
Victor J. Evans

Inventor
Oluf O. Fjeld.
By John Wedderburn.
Attorney

No. 612,093. Patented Oct. 11, 1898.
O. O. FJELD.
CULTIVATOR.
(Application filed June 1, 1897.)
(No Model.) 2 Sheets—Sheet 2.
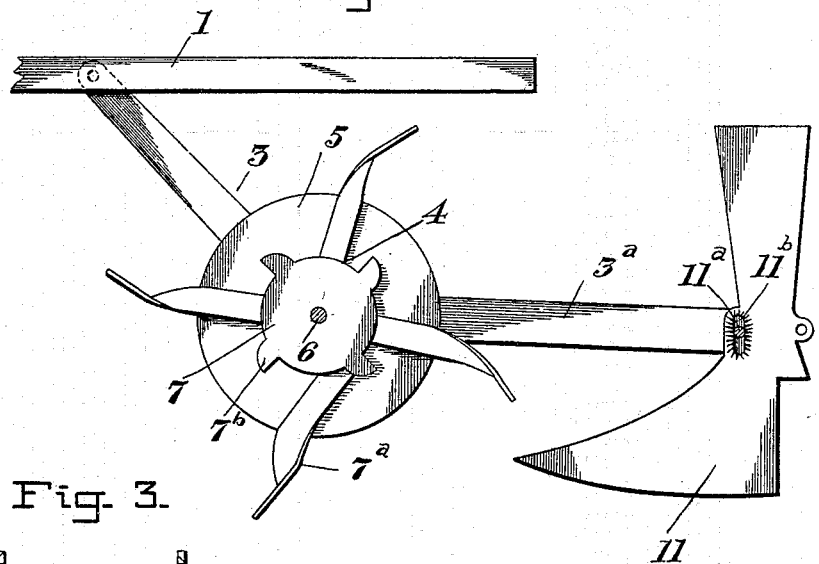
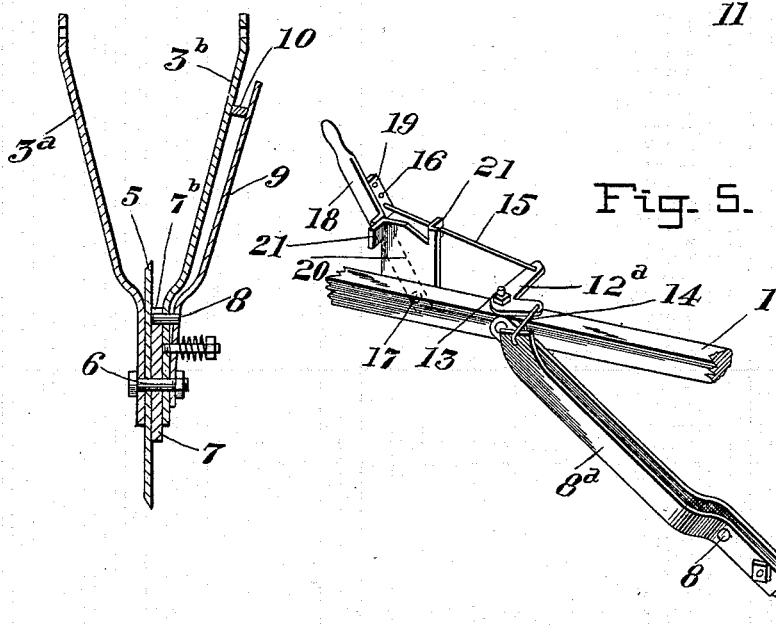
Witnesses
Chas. P. Heinemann.
Victor J. Evans
Inventor
Oluf O. Fjeld.
By John Wedderburn.
Attorney

UNITED STATES PATENT OFFICE.

OLUF O. FJELD, OF MAYVILLE, NORTH DAKOTA.

CULTIVATOR.

SPECIFICATION forming part of Letters Patent No. 612,093, dated October 11, 1898.

Application filed June 1, 1897. Serial No. 638,855. (No model.)

*To all whom it may concern:*

Be it known that I, OLUF O. FJELD, of Mayville, in the county of Traill and State of North Dakota, have invented certain new and useful Improvements in Cultivators; and I do hereby declare the following to be a full, clear, and exact description of the invention, such as will enable others skilled in the art to which it appertains to make and use the same.

This invention relates to certain improvements in cultivators and in an improved construction of shoe to be used in connection therewith, the object being to provide a shoe which shall prevent the cultivator-blades from sinking or being drawn into the earth beyond a certain depth as well as to automatically raise the cultivator should the blades sink too far into the ground.

The invention also provides means whereby the cultivator-blades, which are arranged upon a suitable plate rotatively mounted in a frame, in meeting an obstruction will be raised, which movement serves to release certain locking devices and permit of the rotation of the blades, so that when the obstruction is met the blade may be passed out of the way and the next succeeding blade brought into position to act upon the soil.

To these ends my invention comprises certain novel features of construction in the arrangement of the various parts, whereby it is made simpler, more durable, and better adapted for the purposes for which it is intended, as will be hereinafter fully described, and specifically defined in the appended claims.

Figure 1:
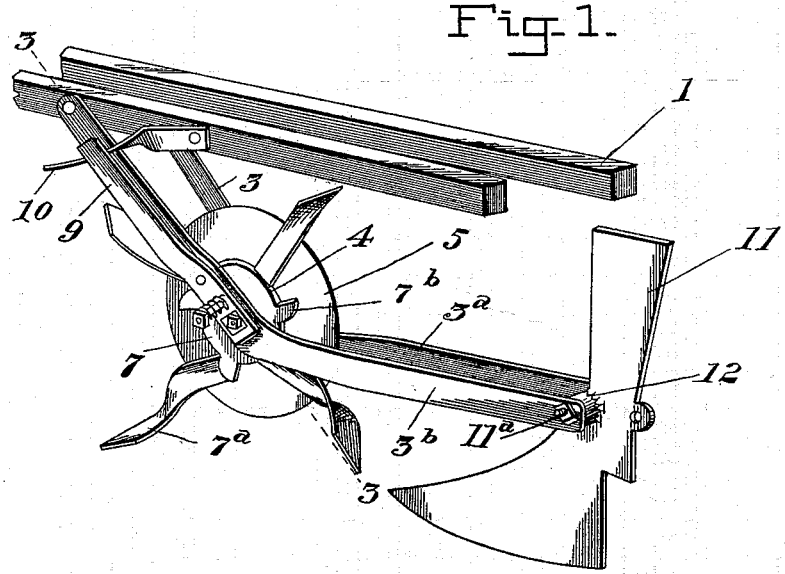
Figure 2:
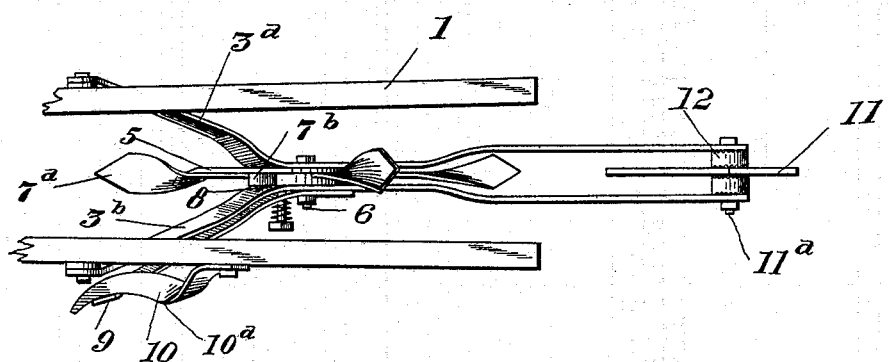

In the accompanying drawings, Figure 1 represents a perspective view of a portion of a cultivator having my invention applied thereto. Fig. 2 is a plan view. Fig. 3 is a detail sectional view on the line 3 3 of Fig. 1. Fig. 4 is a vertical longitudinal section taken adjacent to the cultivator-blade, and Fig. 5 is a detail perspective view of the operating mechanism.

Similar reference-numerals indicate corresponding parts in all the figures of the drawings.

1 designates the frame, which may be of any desired or usual construction; 2, the axle thereof, and 3 the main bars, pivotally connected to the frame 1. The main bars 3 comprise two members $3^a$ and $3^b$, arranged so as to provide a suitable space in which the cultivator 4 and colter 5 are rotatively held, a bolt 6 serving as a common journal for both. This bolt passes through suitable openings in the main bar and corresponding openings in the colter and cultivator, which latter comprises a shank 7, having a plurality of radially-arranged cultivator-blades $7^a$ and a series of locking-teeth $7^b$, a locking device comprising a dog or pawl 8 being arranged to project through a suitable opening in the main bar in such manner that it may engage with the teeth $7^b$ and be withdrawn from contact therewith to permit of the rotation of the cultivator-blades, as I shall presently describe.

The dog or pawl 8 is arranged upon a spring-arm 9, one end of which connects with the main bar, and the other free end bears upon a tripping-arm 10, secured to the frame 1 in in any suitable manner. The tripping-arm 10 has an upwardly-inclined surface $10^a$, so that when the cultivator-blade has met an obstruction and the main bar rises in consequence the spring-arm 9 will be forced outwardly, causing the dog or pawl 8 to withdraw from contact with the teeth $7^b$ of the shank 7, thus permitting the cultivator to revolve, so as to bring the next succeeding blade into operative position.

As a further means of preventing the cultivator-blades from sinking or being drawn too deeply into the soil, I provide the outer ends of the main bar with a shoe 11, which is held in place by a bolt $11^a$, which passes through suitable openings in the main bar and an elongated opening $11^b$ in the shoe 11. The shoe comprises a plate having an inwardly and upwardly curved lower end, and the lowest point thereof is adapted to rest upon the soil, the elongated opening therein admitting of the adjustment of the shoe, so as to regulate the depth which it is intended the cultivator-blades shall penetrate the soil. The inner faces of the outer extremities of the main bar are serrated or roughened, and the shoe adjacent to the opening therein is correspondingly serrated or roughened for the purpose of engaging the corrugated face of the collars 12, which fit upon the bolt at each side of the shoe, as clearly shown. This construction will prevent either a pivotal or vertical movement of the shoe after it has once been set, the tightening on the bolts serving to bind the parts together. The shoes are also provided with suitable openings to which the ordinary chains may be fastened, so that they may be raised from the ground when desired.

In order to enable the operator to release the cultivators individually, auxiliary mechanism is employed, the same being mounted upon the frame of the cultivator. This mechanism comprises, essentially, an elbow-lever 12ª, which is fulcrumed at its elbow on a stud or journal 13. One arm of the elbow-lever is connected to the free end of the spring-bar 8ª by means of an interposed link 14. Connected pivotally to the other end of the elbow-lever is a rod 15, which extends forward, where it passes through one of a series of perforations 16 in the laterally-bent flange 19 of a combined hand and foot lever 18, fulcrumed on the machine-frame at a point 17. Secured to the frame is a keeper or rack 20, having laterally-projecting offsets or teeth 21, adapted to engage the lever for holding the same in its forward or rearward position. By rocking the lever forward either by the pressure of the hand or foot it springs into engagement with one of the teeth of the rack, and thus draws the spring-bar 8ª inward, causing the catch thereof to engage with the teeth on the shank 7 for holding the teeth stationary. By pushing the hand or foot lever to one side the tension of the spring-bar 8ª moves the lever rearward and at the same time withdraws the catch from engagement with the teeth, thus allowing the lowermost cultivator-tooth to move backward for the purpose above cited.

In the construction first described the spring-arm 8 has a normal inward tendency, while in the construction last described said arm is arranged to normally spring outward and is drawn inward by means of the foot and hand lever described. Thus when the driver or operator sees that the machine is approaching a rock or other hard object he may throw the spring-bar out of engagement with the teeth instead of allowing the device to operate automatically.

It will thus be seen that as the cultivator-blades sink into the ground beyond a certain depth the lower edge of the shoe will serve to raise the main bar, so as to bring the blades again to their proper level.

Obviously many modifications may be made of my invention without departing from the essential features thereof, and I do not wish to be understood as limiting myself to the precise details of construction herein shown and described, but reserve the right to make such changes and alterations therein as may be considered to fairly fall within its spirit and scope.

Having thus described my invention, what I claim as new, and desire to secure by Letters Patent, is—

1. A cultivator comprising a frame, bars pivotally connected to said frame, and a plurality of cultivator-blades pivotally mounted between said bars, teeth arranged on said cultivator-blades, a spring-arm having a locking device arranged to engage said teeth, a tripping-arm connected to the frame to engage the free end of said spring-arm for automatically moving it to release the locking device from engagement with the teeth of the cultivator through the upward rise of the bars in meeting an obstruction, substantially as described.

2. A cultivator comprising a frame, bars pivotally connected to said frame and carrying a plurality of cultivator-blades rotatably mounted therein, a locking device engaging teeth secured to the cultivator-blades to prevent the rotation thereof, a spring-arm upon which said locking device is mounted, an arm on the frame for automatically tripping said locking device when the cultivator-teeth are raised, and a lever connected with said spring-arm for enabling the attendant to trip the locking device at will, substantially as described.

3. A cultivator comprising a frame, bars pivotally connected to said frame, and a plurality of cultivator-blades rotatably mounted in said bars, teeth arranged on said cultivator-blades, a spring-arm carrying a locking device arranged to engage said teeth, a tripping-arm connected to said frame adapted to engage the outer free end of the spring-arm for automatically releasing the locking device when the pivoted bars are vibrated upwardly, in combination with an adjustable shoe comprising a plate having a forwardly and upwardly curved lower end, and an elongated opening, and a bolt adapted to pass through said opening in the shoe and openings in the pivoted bars, collars arranged upon said bolt and adapted to bear on the sides of the shoe and the bars whereby said shoe is adapted to be adjusted for determining the depth of penetration of the cultivator-blades, substantially as described.

In testimony whereof I have signed this specification in the presence of two subscribing witnesses.

OLUF O. FJELD.

Witnesses:
  O. J. ROBINSON,
  TH. GERDRUM.